United States Patent
Tsai et al.

[11] Patent Number: 5,769,551
[45] Date of Patent: Jun. 23, 1998

[54] EXPANDABLE KEYBOARD FOR A PORTABLE COMPUTER

[75] Inventors: Phillips Tsai, Taipei, Taiwan; Richard T. Hsu, San Jose, Calif.; Sohrab Vossoughi, Portland, Oreg.

[73] Assignee: Acer Advanced Labs, Inc., San Jose, Calif.

[21] Appl. No.: 630,017

[22] Filed: Apr. 9, 1996

[51] Int. Cl.$^6$ .................................................. B41J 5/10
[52] U.S. Cl. ........................................ 400/489; 361/680
[58] Field of Search .................................. 400/489, 472; 345/168; 341/22; 361/680

[56] References Cited

U.S. PATENT DOCUMENTS

| | | | |
|---|---|---|---|
| 5,187,644 | 2/1993 | Crisan | 361/393 |
| 5,220,521 | 6/1993 | Kikinis | 364/709 |
| 5,237,486 | 8/1993 | LaPointe et al. | 361/681 |
| 5,267,127 | 11/1993 | Pollitt | 361/680 |
| 5,341,154 | 8/1994 | Bird | 345/168 |
| 5,428,355 | 6/1995 | Jondrow et al. | 361/680 |
| 5,457,453 | 10/1995 | Chiu et al. | 341/22 |
| 5,502,460 | 3/1996 | Bowen | 345/168 |
| 5,543,787 | 8/1996 | Karidis et al. | 341/20 |
| 5,588,759 | 12/1996 | Cloud | 400/472 |
| 5,596,480 | 1/1997 | Manser et al. | 361/680 |
| 5,613,786 | 3/1997 | Howell et al. | 400/489 |

FOREIGN PATENT DOCUMENTS 404268907  9/1992  Japan .................................. 361/680

*Primary Examiner*—Edgar S. Burr
*Assistant Examiner*—Daniel J. Colilla
*Attorney, Agent, or Firm*—Townsend and Townsend and Crew LLP

[57] ABSTRACT

An apparatus and method for expanding a portable computer keyboard (6) to approximate a full size desktop keyboard. The device and method include a linkage assembly (8) for automatically separating first and second keyboard portions (44, 46) from each other when the display module (22) of the computer is opened into its operating configuration. The linkage assembly is further adapted to automatically move the keyboard into a collapsed position when the display module is closed into the carrying or carrying configuration. In one embodiment, the keyboard portions are pivoted away from each other to form an angle therebetween to improve user hand and wrist orientation during use of the keyboard.

13 Claims, 5 Drawing Sheets

EXPANDABLE KEYBOARD FOR A PORTABLE COMPUTER

BACKGROUND OF THE INVENTION

The present invention relates generally to personal computers and more particularly to ergonomically designed, expandable keyboards for portable computers, such as laptop or notebook computers.

With the aid of microelectronics, portable personal computers have steadily decreased in size from their early "suit case" design, through the smaller "laptop" design, and now to the slender "notebook" variation. Unfortunately, the decreasing size of portable computers has forced manufacturers to make certain compromises when designing portable computers. For example, laptop and notebook computers typically have keyboards that are less than full size, i.e., the size of an average desktop personal computer. In addition, because the alphanumeric keys must be of sufficient size to accommodate the user's fingers, certain keys are often deleted or rearranged from their "usual" position on the keyboard to retain compactness. These accommodations have forced users to sacrifice the available options associated with the missing keys and they made it more difficult for many users to transfer their typing skills to the smaller keyboards on laptops or notebooks.

Another drawback with portable computers is that size constraints generally limit the ergonomic design features that may be incorporated into the keyboard. For example, it has been found that frequent use of conventional keyboards can result in injuries because the operator's arms and hand muscles are typically operating outside their natural range. Tendons, muscles and nerves are adversely affected and this abuse can, over time, lead to repetitive stress injuries, such as tendinitis or carpal tunnel syndrome. To minimize repetitive stress injuries, a recent innovation, often termed a "split keyboard", has been developed for desktop computers. In the split keyboard, the right hand keys (the keys typically pressed by the user's right hand) are separated from the left hand keys (the keys pressed by the left hand). In addition, the right and left hand keys are oriented at an outward angle relative to each other to improve user hand and wrist orientation during keyboard use.

Unfortunately, the above measures for improving the ergonomics of desktop keyboards have not been quite as successful with portable computers, i.e., laptop or notebook computers. Separating the right and left hand keys from each other and/or arranging these keys at outward angles relative to each other would increase the size requirements of the keyboard. Increasing the size of the keyboard in portable computers would, of course, further limit the number and/or size of the individual keys.

What is needed, therefore, are devices and methods for improving the ergonomics of portable computers. In particular, these devices and methods should be capable of expanding the portable computer keyboard to more closely approximate a full size desktop keyboard. In addition, these devices and methods should provide right and left hand keys that are suitably positioned to place the user's hands in a more natural position during operation of the keyboard without appreciably increasing the overall exterior dimensions of the computer.

SUMMARY OF THE INVENTION

The present invention is directed to a device and method for expanding a portable computer keyboard to a size that more closely approximates a full size desktop keyboard. In addition, the device and method of the invention are capable of separating the left hand and right hand keys from each other and positioning these keys at an angle relative to each other, thereby improving user wrist and hand orientation during use of the keyboard.

The device of the present invention includes a main housing for holding a central processing unit and a lid for carrying a display panel. The lid is pivotally mounted to the housing for movement between open and closed positions. The housing includes a keyboard having first and second, separate portions mounted within the housing. A linkage assembly is coupled to the housing for moving the first and second keyboard portions between a carrying position, where the keyboard portions are arranged close together, and an operating position, where the keyboard portions are spaced apart from each other. In this manner, the keyboard can be moved between a larger, ergonomic configuration during use and a smaller, conventional configuration during storage or transit.

In one embodiment, the keyboard portions can be pivoted away from each other so that the right and left hand keys are angled outward in the operating position. This configuration improves the user's hand and wrist orientation during operation of the keyboard to minimize repetitive stress injuries. In addition, the keyboard portions are spaced apart from each other in the operating position so that the keyboard approximates the size of a desktop keyboard, making it easier for users to transfer their typing skills to the portable computer. To increase the options available to the user, the portable computer may also include an additional set of keys within the space or gap between the right and left hand keys in the operating position. Alternatively, this gap may be left open to facilitate the dissipation of heat generated by the central processing unit and associated electronics within the computer housing.

Another advantage of the invention is that the linkage assembly is responsive to movement of the lid to automatically move the keyboard into the operating position as the lid is opened and to automatically move the keyboard into the carrying position as the lid is closed. The operator simply opens and closes the lid and the keyboard will automatically pivot into the operating and carrying positions.

In an exemplary embodiment, the lid is pivotally coupled to the main housing via a hinge. The linkage assembly comprises a switch positioned to actuate a reversible motor when the switch is engaged and disengaged by the pivoting hinge. The motor drives a shaft which is coupled to a gear mechanism that translates the rotational motion of the shaft into pivoting of the keyboard portions. The linkage assembly may also include a disabling mechanism for preventing the linkage assembly from automatically moving the keyboard between the operating and carrying positions as the lid is opened and closed.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE SPECIFIC EMBODIMENTS

Figure 1:
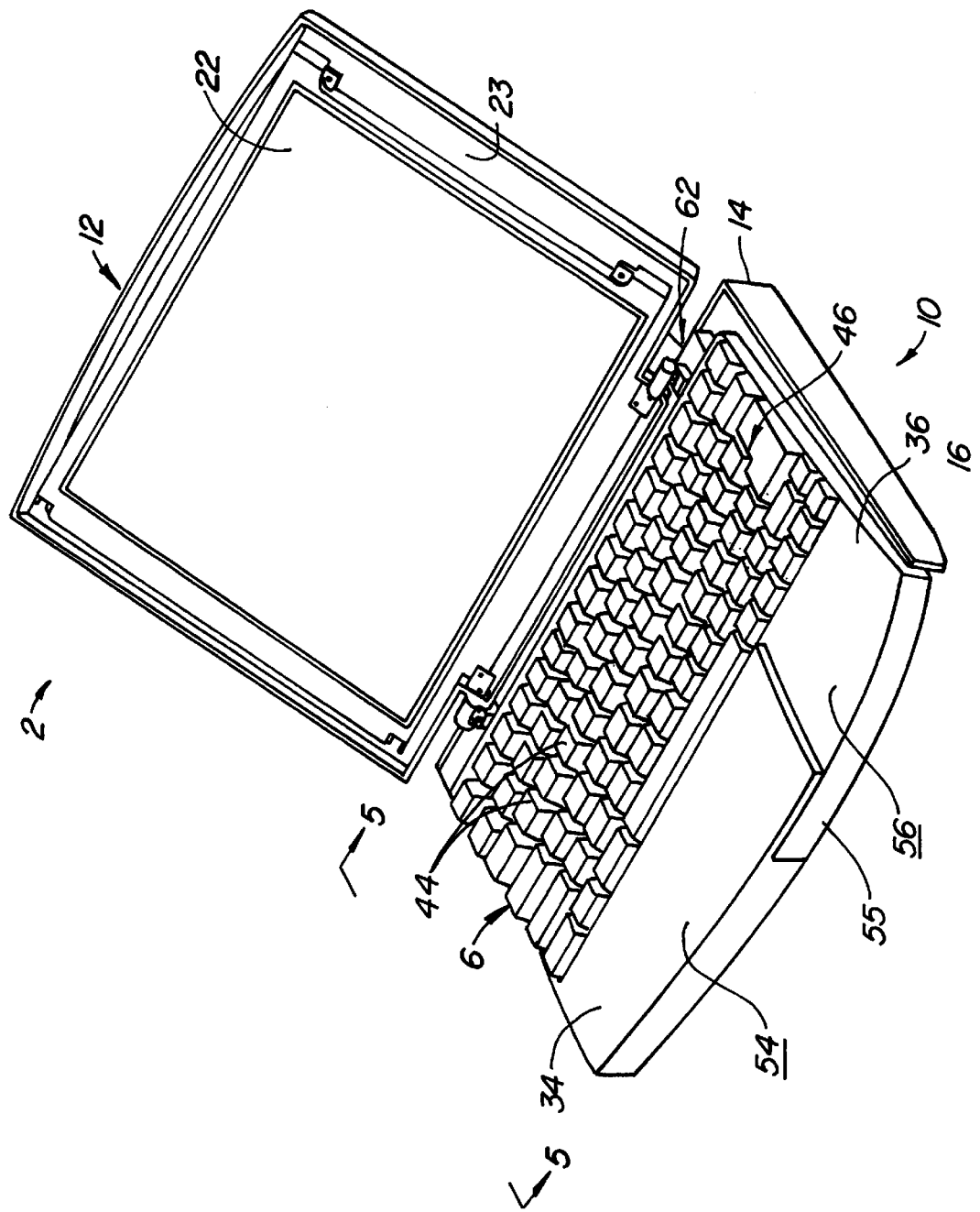
FIG. 1 is a perspective view of a representative portable computer incorporating an expandable upper chassis and keyboard according to the present invention, illustrating the chassis and keyboard in the carrying position.

Referring to the drawings in detail, wherein like numerals indicate like elements, a representative portable computer 2 generally includes a base housing 10 and a rectangular lid 12 conventionally secured to a rear wall 14 of housing 10 for pivoting lid 12 between its illustrated upright open position and a lowered closed position (not shown). Housing 10 will also include a central processing unit, a disk drive, a printed circuit board and other conventional features (not shown), such as an internal floppy disk drive, CD ROM drive, modem port, etc. Lid 12 carries a display panel having a screen portion 22 extending across a front side 23 of lid 12 and visible to the computer user when the lid is in its upright open position. Lid 12 further includes a latch (not shown) for latching lid 12 in the lowered closed position. Lid 12 and base housing 10 are each formed in one integral piece from a molded plastic material, as is conventional in the art.

Figure 2:
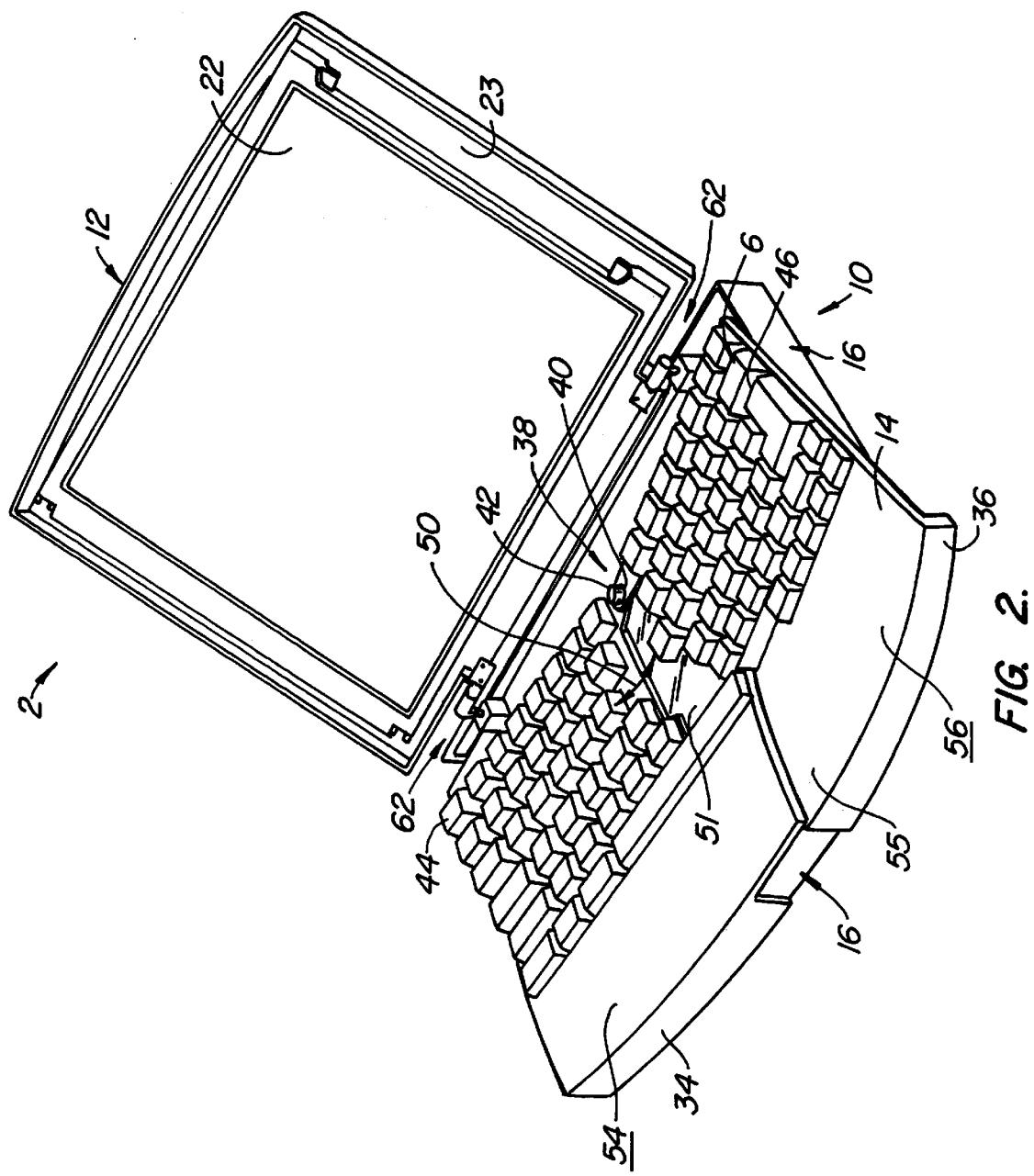
FIG. 2 is a perspective view of the portable computer of FIG. 1, illustrating the upper chassis and keyboard in the operating position.
Figure 5:
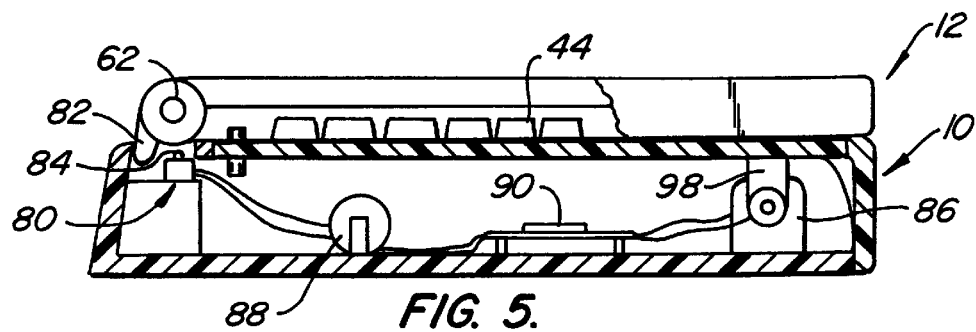
FIG. 5 is a left side elevational view of the embodiment of FIG. 1 taken along lines 5—5 but with the lid in a closed position with portions broken away to show internal structure.

Referring to FIGS. 1 and 2, base housing 10 includes upper and lower plastic casings 14, 16 movably coupled together and a keyboard 6 mounted to upper casing 14. Upper casing 14 is preferably divided into left and right hand sections 34, 36 that are pivotally coupled to each other. As shown in FIG. 5, casing sections 34, 36 preferably each have a distal flange 38 defining a hole 40 for receiving a pivot pin 42 so that casing sections 34, 36 may be rotated about pivot pin 42. Pivot pin 42 also serves to connect upper casing sections 34, 36 to lower casing 16.

With reference to FIG. 1, keyboard 6 includes a plurality of keys, a touchpad/trackball (not shown) and other conventional input devices. Keyboard 6 is divided into left hand and right hand keys 44, 46 each mounted on upper casing sections 34, 36, respectively. Left hand keys 44 generally include the keys typically pressed by the user's left hand and right hand keys 46 include the keys typically pressed by the user's right hand. Although the exact makeup of left and right hand keys 44, 46 may vary, the invention preferably divides the keyboard in a conventional manner (i.e., the keys including and disposed on the right of keys 6, y, h and n on a conventional keyboard will be mounted on right hand casing section 34 and vice versa).

Keyboard 6 and upper casing 14 are movable between a closed, carrying position (FIG. 1), where the casing sections 34, 36 and the left and right hand keys 44, 46 are disposed together, and an open, operating position (FIG. 2), where the casing sections 34, 36 and keys 44, 46 are separated from each other. In the preferred configuration, casing sections 34, 36 pivot outward so that left and right hand keys 44, 46 are oriented at an angle with respect to each other in the operating position. This orientation approximates the natural position of the user's wrist and hands to make it more comfortable to operate the keyboard. The angle between left and right hand keys 44, 46 is usually between 1° to 30° and preferably between 5° to 15°. Housing 10 may optionally include a controller (not shown) for manually setting the angle of separation.

As shown in FIG. 2, casing sections 34, 36 will define a gap 50 therebetween in the operating position. The size of gap 50 will generally depend on the angle between keys 44, 46 and will usually be about 1 to 15. Lower casing 14 includes a thermally conductive sheet 51 positioned within gap 50 and thermally connected to at least the central processing unit (not shown) within housing 10. Thermally conductive sheet 51 acts as a heat sink to draw heat generated by the central processing unit and other heat, producing electronic components inside of housing 10. Gap 50 allows sheet 51 to dissipate this heat to the environment surrounding computer 2. This helps to ensures that the heat producing components within housing 10 remain within their normal operating temperature ranges to prevent these components from failing immediately or having too short a lifetime.

It should be understood that the invention is not limited to the configuration described above and shown in FIGS. 1 and 2. For example, instead of a gap 50 between keys 44, 46 in the open position (FIG. 2), more keys may be provided on conductive sheet 51 of lower chassis 16 between left and right hand keys 44, 46 to increase the number of keys and, consequently, the available options for the user. The additional keys may remain on upper surface (i.e., below keys 44, 46) or they may be raised to a level position with keys 44, 46 via a suitable actuator.

Upper casing sections 34, 36 each define a proximal hand and wrist support surface 54, 56 for supporting the user's hands during operation of keyboard 6. Preferably, one of the support surfaces 56 is longer than the other support surface 54 and has an extension 55 that projects inside of the other surface 54 in the closed position (FIG. 1). With this configuration, when casing sections 34, 36 are moved into the open position (FIG. 2), the overall support surface 54-56 for the user's hands and wrists increases. Thus, the user is provided with a larger surface area for resting his or her palms during operation of keyboard 6.

Figures 3, 4:
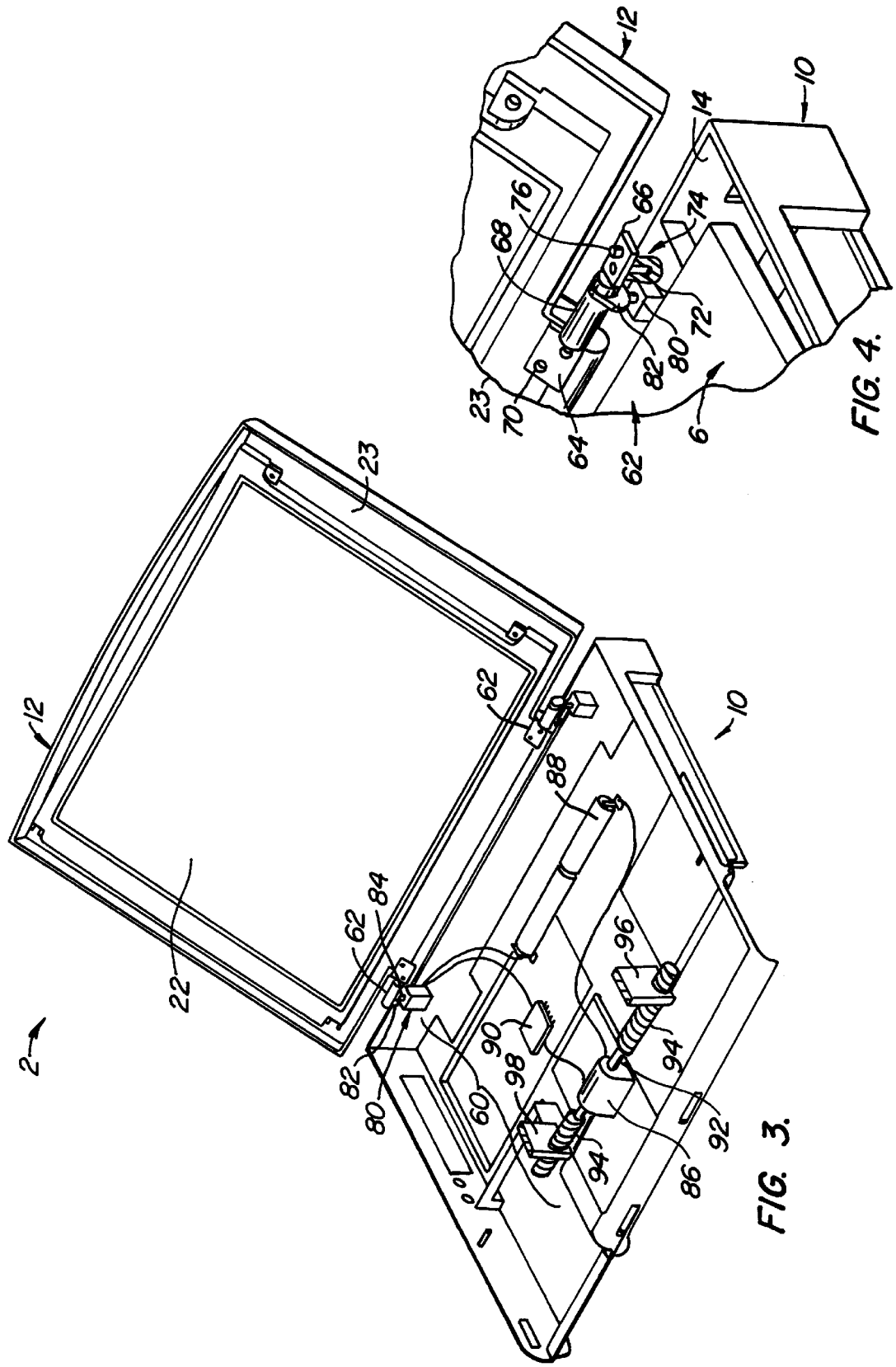
FIG. 3 is a perspective view of the portable computer of FIG. 1 without the keyboard and upper chassis, illustrating a linkage assembly for expanding the upper chassis and keyboard.
FIG. 4 is an enlarged view of a portion of the linkage assembly of FIG. 3.

Referring to FIG. 3, a linkage assembly 60 is disposed within housing 10 for pivoting casing sections 34, 36 and keys 44, 46 between the carrying and operating positions. Linkage assembly 60 is responsive to movement of lid 12 to automatically pivot casing sections 34, 36 and keys 44, 46 into the operating position when lid 12 is opened, as is shown in FIG. 1, and to automatically pivot sections 34, 36 and keys 44, 46 into the carrying position when lid 12 is closed. However, linkage assembly 60 can also be configured for manual operation by the user, if desired.

FIGS. 3–5 illustrate a specific embodiment of linkage assembly 60. In this embodiment, linkage assembly 60 comprises a pair of hinges 62 on opposing ends of lid 12 for pivotally coupling the lid to base housing 10. As best shown in FIG. 4, each hinge 62 comprises a hinge housing 64 fixed to lid 12, a shaft adapter 66 fixed to housing 10 and a tubular member 68 therebetween. Hinge housing 64 is a generally rectangular plate having holes 70 for receiving screws (not shown) to thereby attach hinge housing 64 to front panel 23 of lid 12. Shaft adapter 66 has a downwardly extending protrusion 72 that cooperates with a hole 74 in housing 10 to attach hinge 62 to housing 10. Hinge 62 preferably comprises a clutch 76 interposed between hinge housing and shaft adapter 66, 68 for limiting the rotational movement of lid 12 to minimize any damage that the user may cause by opening or closing lid 12 too quickly.

Referring to FIGS. 3 and 5, linkage assembly 60 further includes a switch 80 positioned within housing 10 to cooperate with one of the hinges 62 and to actuate a drive for pivoting chassis pieces 34, 36 when lid 12 is opened and closed. One of the hinges 62 includes a downwardly extending protrusion 82 that engages a pressure sensitive contact 84 on switch 80 when lid 12 has been pivoted a selected distance towards the open position. Engagement of contact 84 activates switch 80, which, in turn, actuates the drive to pivot casing sections 34, 36 and keyboard portions 44, 46 into the open position of FIG. 2. As lid 12 is closed, protrusion 82 will disengage contact 84, causing switch 80 to actuate the drive to pivot casing sections 34, 36 and keys 44, 46 into the closed position of FIG. 1. Preferably, switch 80 will be suitably positioned so that drive can pivot sections 34, 36 into the closed position before the lid 12 is completely closed.

As shown in FIG. 3, switch 80 is electrically coupled to a reversible DC motor 86, a source of electrical power 88 and a control chip 90 for controlling actuation of DC motor 86. Motor 86 is positioned towards the center of housing 10 and mounted to a drive shaft 92 having a wormgear 94 extending in both directions from motor 86. Couplings 96, 98 are threadably mounted to wormgear 94 on either side of motor 86 such that rotation of wormgear 94 causes translation of couplings 96, 98. Wormgear 94 has a reversed threading on either side such that, when motor 86 rotates wormgear 94 in one direction couplings 96, 98 will move in opposite directions from each other. For example, when wormgear 94 is rotated in the clockwise direction, couplings 96, 98 when move outward away from motor 86 and vice versa.

Figure 6:
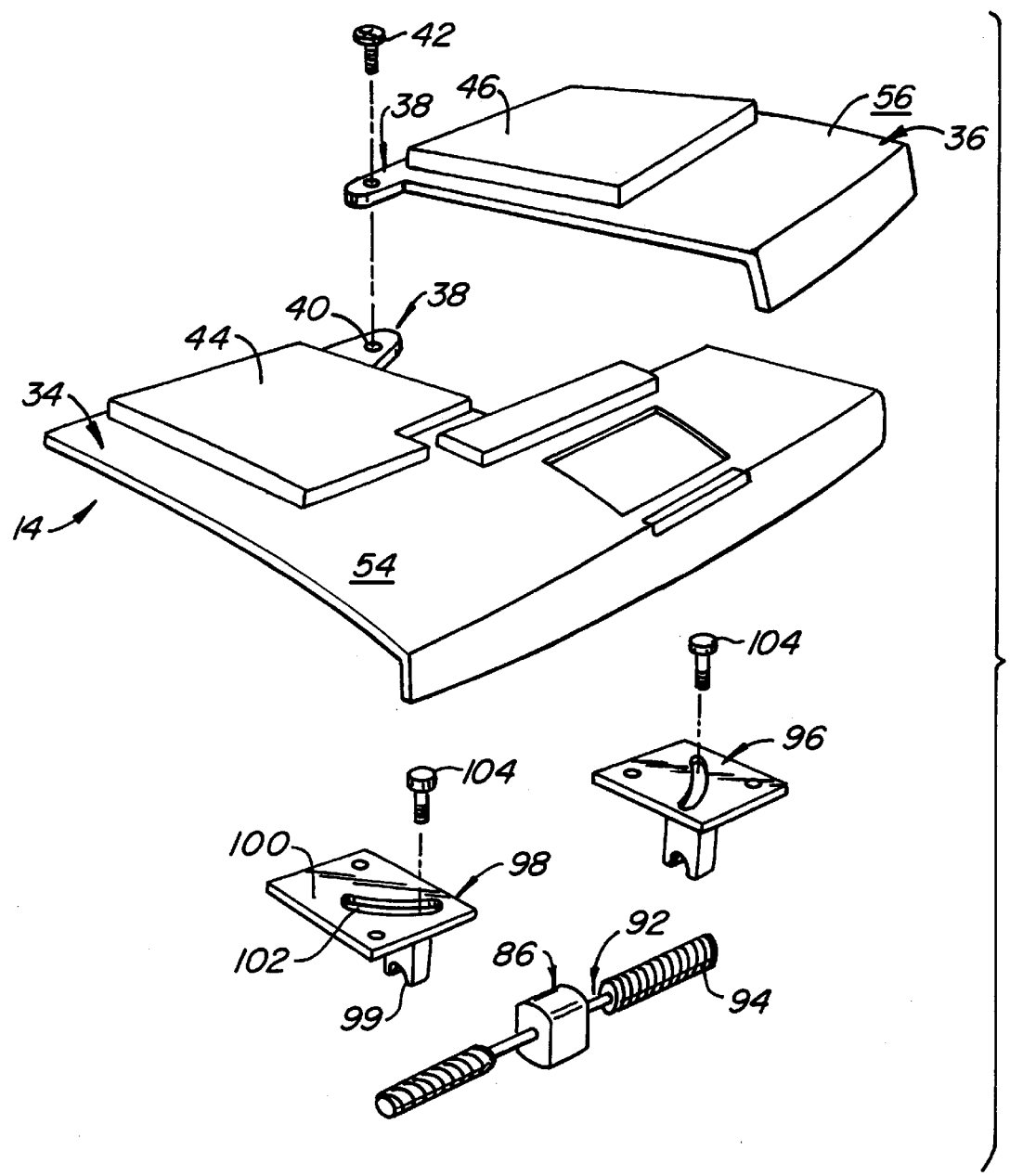
FIG. 6 is an exploded view of the linkage assembly of FIG. 3.

As shown in FIG. 6, couplings 96, 98 each comprise an upper plate 100 coupled to a linkage 99 that cooperates with wormgear 94 to translate couplings 96, 98. Each plate 100 has a groove 102 defined therein. Upper casing sections 34, 36 each include a pin 104 extending downward from a lower surface thereof (not shown) and movably disposed within grooves 102. Grooves 102 are shaped such that, when couplings 96, 98 are translated along the longitudinal axis of worm gear 94, pins 104 will follow grooves 102 and cause casing sections 34, 36 to pivot outwards about pivot pin 42 between the carrying and operating positions (FIGS. 1 and 2).

It should be understood that the present invention is not limited to the linkage assembly described above and illustrated in the drawings. For example, linkage assembly 60 may comprise a manual system that directly translates the pivotal motion of lid 12 into pivoting of casing sections 34, 36. This manual system may comprise a variety of conventional mechanical transducers, such as a cams, levers, gears, springs, and the like. Alternatively, linkage assembly may comprise a manual or automatic system that is separately actuated by the user and, therefore, is not dependent upon opening and closing lid 12.

The present invention preferably includes a mechanism (not shown) for disabling linkage assembly 60 so that it will not pivot chassis 14 and keyboard 6 when lid 12 is opened or closed. A suitable disabling mechanism is described in commonly assigned, co-pending application Ser. No. 08/521,531, filed Aug. 29, 1995, the complete disclose of which is incorporated herein by reference.

Figure 7B:
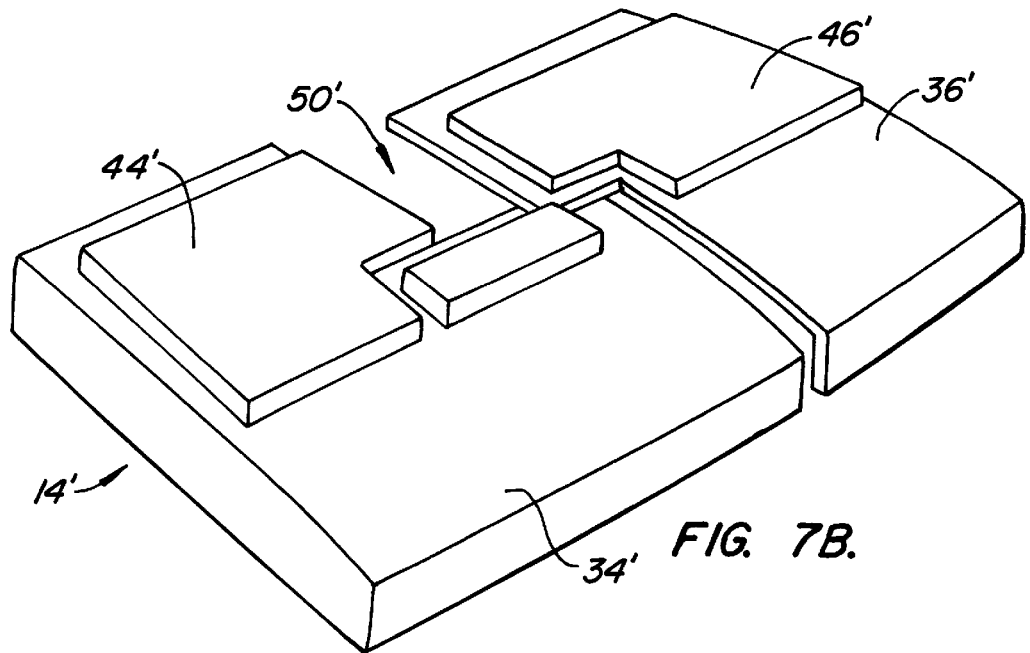
FIGS. 7A and 7B are schematic illustrations of another embodiment of the portable computer, illustrating the upper chassis and keyboard in the operating and carrying positions, respectively.
Figure 7A:
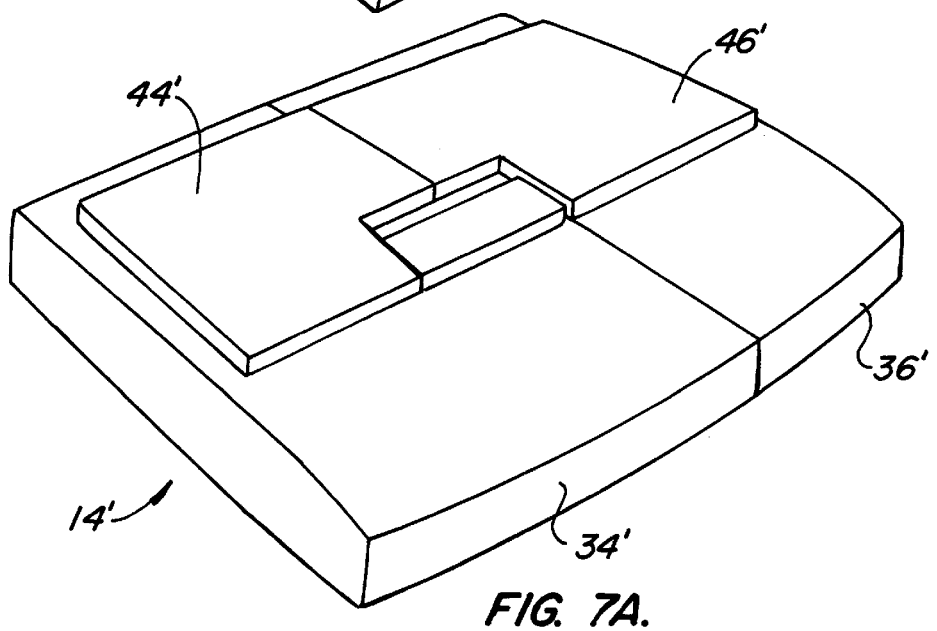

FIGS. 7A and 7B illustrate an alternative embodiment of the present invention. In this embodiment, casing sections 34', 36' are not coupled to each other (i.e., no pivot pin 42) and, therefore, sections 34', 36' separate from each other when moved into the operating position (FIG. 7B). In addition, casing sections 34', 36' remain substantially parallel to each other in the operating position (they do not pivot outward as in the previous embodiment). As shown, casing sections 34', 36' and left and right hand keys 44', 46' are movable between a closed, carrying configuration (FIG. 7A), where sections 34', 36' and keys 44', 46' are positioned adjacent to each other, and an open, operating position (FIG. 7B), where they are completely separated and parallel to each other. Preferably, casing sections 34', 36' will be separated by a distance of 0 mm to 30 mm in the operation position. As in the previous embodiment, the lower casing 16 may include an additional set of keys disposed within the gap 50' between casing sections 34', 36'. In this embodiment, the linkage assembly (not shown) will preferably be similar to the above linkage assembly except that the couplings will simply be fixed to casing sections 34', 36' so that sections 34', 36' move parallel to the drive shaft.

Although the foregoing invention has been described in detail for purposes of clarity of understanding, it will be obvious that certain modifications may be practiced within the scope of the appended claims. For example, the linkage assembly of the present invention can be utilized with a variety of conventional and non-conventional portable computers other than the representative computer described above and shown in the figures.

What is claimed is:

1. A portable computer comprising:

a housing having an upper casing and a lid movably coupled to the upper casing, wherein the upper casing comprises first and second upper casing sections;

first and second keyboard portions fixed to the first and second upper casing sections, respectively, such that the first and second keyboard portions move with the first and second upper casing sections;

a linkage coupled to the housing that enables moving the first and second keyboard portions between a carrying position, where the first and second keyboard portions are arranged close together, and an operating position, where the first and second keyboard portions are spaced apart from each other to define a gap therebetween; and a switch operably positioned within the housing to actuate the linkage when the lid is opened and closed, wherein the linkage comprises a gear shaft, a motor for rotating the gear shaft and first and second couplings attached to the gear shaft and the first and second upper casing sections, respectively, the motor being coupled to the switch.

2. The portable computer of claim 1 wherein the lid is movable between open and closed positions, the linkage being responsive to movement of the lid to move the keyboard portions towards the operating position as the lid is moved into the open position and to move the keyboard portions towards the carrying position as the lid is moved into the closed position.

3. The computer of claim 1 wherein the keyboard defines a longitudinal axis, the keyboard portions being reciprocable in a direction substantially parallel to the longitudinal axis.

4. The computer of claim 1 wherein the keyboard defines a plane, the keyboard portions being pivotable about an axis perpendicular to the keyboard plane such that the keyboard portions are disposed at an acute angle relative to each other in the operating position.

5. The computer of claim 4 wherein the angle is between about 1 to 15 degrees.

6. The portable computer of claim 1 wherein the housing further defines a lower casing movably coupled to the upper casing, the lower casing housing a central processing unit.

7. The portable computer of claim 6 further comprising a thermally conductive sheet disposed between the central processing unit and the gap between the upper casing pieces for dissipating heat generated by the central processing unit into the environment surrounding the portable computer.

8. The computer of claim 1 wherein the upper casing includes an upper surface adjacent the keyboard portions opposite the lid for supporting the operator's palms during use of the keyboard, the upper surface having a larger surface area in the operating position than in the carrying position.

9. A method for operating a portable computer comprising:

providing a housing having an upper casing, a lid movably coupled to the upper casing and a keyboard disposed over the upper casing;

moving the lid between a closed position overlying the housing and an open position thereby:
engaging a switch disposed within the housing;
actuating a motor coupled to a gear shaft;
rotating the gear shaft; and
translating first and second couplings connected to first and second upper casing sections, respectively, to move the first and second upper casing sections that are fixed to first and second keyboard portions, respectively, between a carrying position where the first and second keyboard portions are adjacent to each other and an operating position where the first and second keyboard portions are spaced apart from each other; and inputting commands to the computer by operating the keyboard portions while they are spaced apart from each other.

10. The method of claim 9 wherein the translating step comprises the step of translating the keyboard portions away from each other so that the keyboard portions remain substantially parallel to each other.

11. The method of claim 9 wherein the keyboard portions define proximal ends remote from the lid, the translating step comprising the step of by pivoting the proximal ends of the keyboard portions away from each other so that the keyboard portions are disposed at an angle relative to each other.

12. The method of claim 9 further comprising:

closing the lid; and moving the keyboard, in response to said closing of the lid, from the operating position to the carrying position with a linkage.

13. The method of claim 9 further comprising dissipating heat from a central processing unit mounted within the housing through a gap between the keyboard portions.

* * * * *